(No Model.)
3 Sheets—Sheet 2.

G. L. SHOREY.
DEVICE OR APPARATUS FOR HEATING PURPOSES.

No. 440,203.
Patented Nov. 11, 1890.

Witnesses
A. E. Leach
M. H. Thompson

Inventor
George L. Shorey
by W. H. H. Dowse
Atty.

(No Model.) 3 Sheets—Sheet 3.
G. L. SHOREY.
DEVICE OR APPARATUS FOR HEATING PURPOSES.

No. 440,203. Patented Nov. 11, 1890.

UNITED STATES PATENT OFFICE.

GEORGE L. SHOREY, OF LYNN, MASSACHUSETTS.

DEVICE OR APPARATUS FOR HEATING PURPOSES.

SPECIFICATION forming part of Letters Patent No. 440,203, dated November 11, 1890.

Application filed May 18, 1887. Serial No. 238,604. (No model.)

*To all whom it may concern:*

Be it known that I, GEORGE L. SHOREY, a citizen of the United States, residing at the city of Lynn, in the county of Essex and Commonwealth of Massachusetts, have invented certain new and useful Improvements in Devices or Apparatus for Heating Purposes, of which the following is a full and complete specification, reference being had to the accompanying drawings, forming a part of this specification, and to the letters marked thereon.

My invention relates to devices for heating railroad-cars and other apartments, and has for its object the production of a heating device adapted to the use of live steam, or of hot water, which shall be both safe and economical. To this end I provide a jacketed stove and a system of radiating-pipes through which the steam or water, as the case may be, circulates. When water is used as a heating agent the water is supplied from a tank placed conveniently at such a height that it will fill the entire system of pipes by gravity alone, the water flowing through the pipes and the chambers of the stove, where it is continually heated by contact with the hot surrounding walls. The stove is so constructed that the doors being closed the fire is completely shut in and surrounded by the water-jackets and grates composing it, and in case of accident all of the outer connections may be torn off and destroyed without affording egress for either the fire or the water in the surrounding chambers. When steam from the locomotive is used as a heating agent, it passes through the stove and thence through the pipes of the car, forcing the water contained in them back into the tank aforesaid. No egress is provided for the steam, and it consequently remains in the pipes until it is condensed into water, which is automatically removed when necessary to permit the introduction of fresh steam.

With this apparatus danger from fire is impossible, and either method of heating may be used, according to the equipments of the various roads over which the car is run. Change may also be made from one to the other with great facility and speed.

Figure 1:
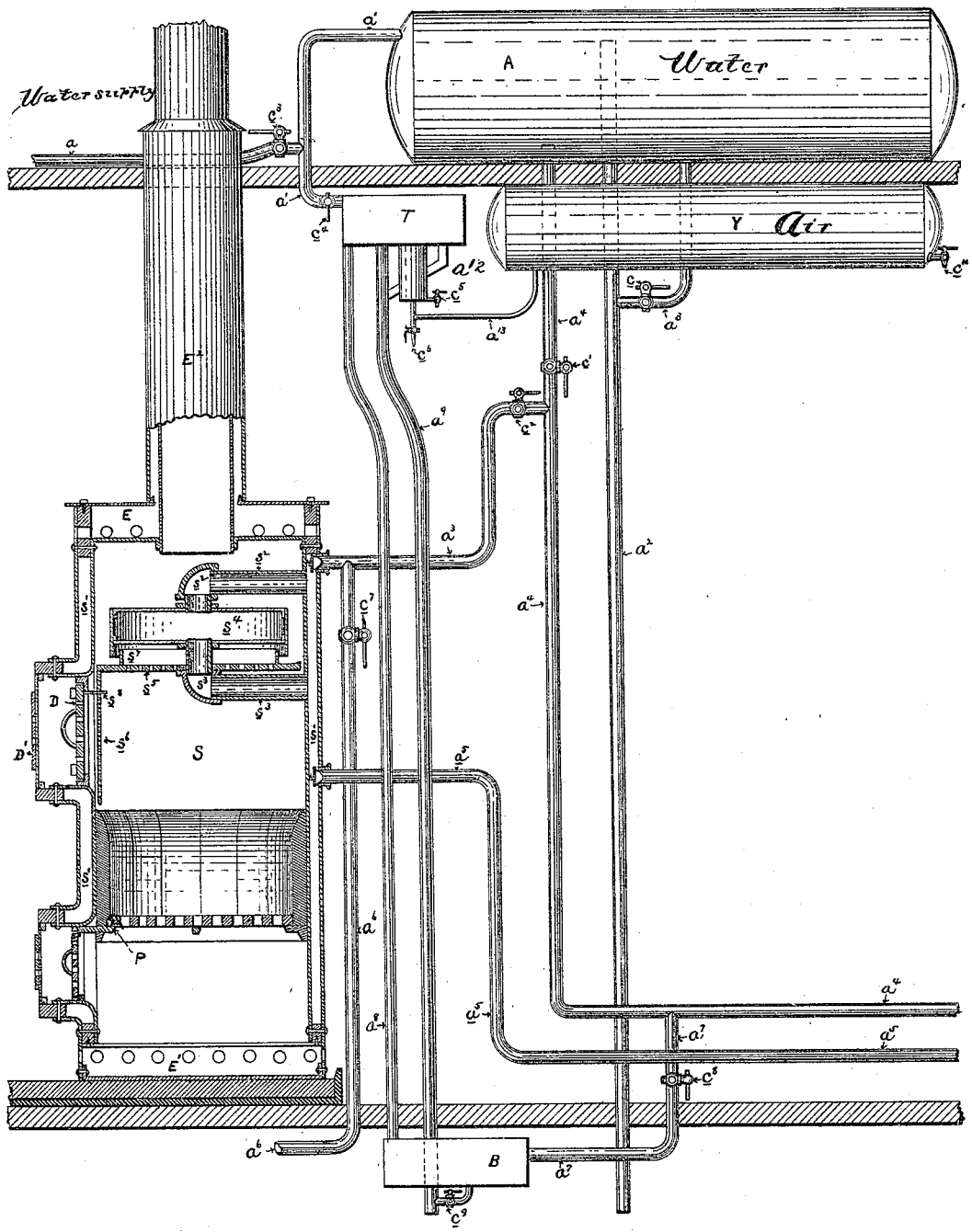
Figure 2:
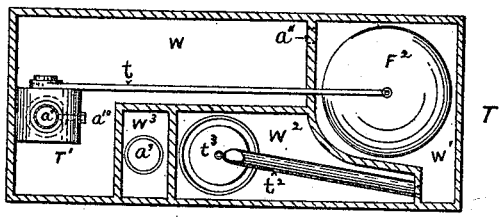
Figure 3:
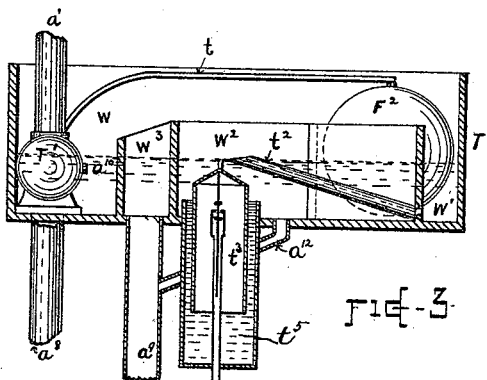
Figure 4:
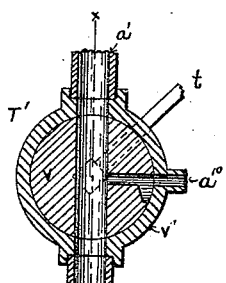
Figure 5:
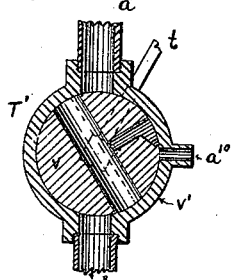
Figure 6:
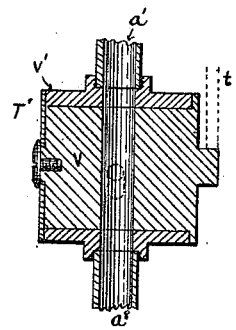
Figure 7:
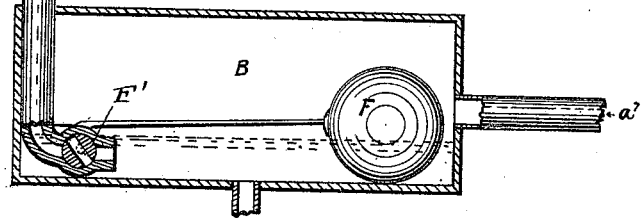
Figure 8:
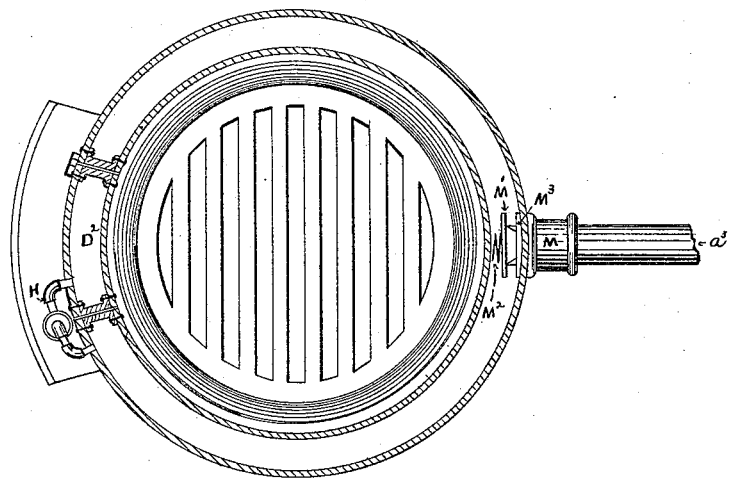
Figure 9:
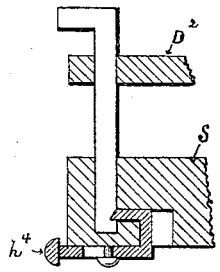
Figure 10:
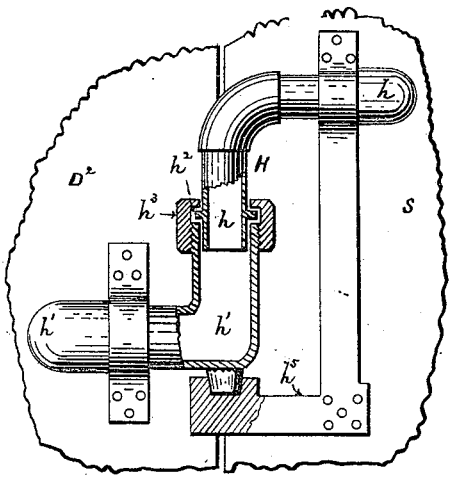

Referring to the drawings, Figure 1 is a side elevation and partial section of the system, showing a section of the stove and its water-jackets and all pipe-connections. Fig. 2 is a plan view of the thermostat, which controls the admittance of fresh steam. Fig. 3 is a side section of the same. Fig. 4 is a side section of the differential valve, showing the same open. Fig. 5 is a side section of the same shut. Fig. 6 is a section on line $x\,x$, Fig. 4. Fig. 7 is a side section of the steam-trap. Fig. 8 is a plan section of the stove, showing the same provided with a water-jacketed door. Fig. 9 shows the latch used on the same. Fig. 10 shows the hinge by which steam is supplied to water-jacket in door.

A is the water-tank, which is supplied with water from the water-supply pipe $a$ through the ingress-pipe $a'$. It has an overflow $a^2$ and draw-off pipe $a^3$, with cock $c$. The tank being filled with water, the cock $c^3$ is closed. When the car is to be heated with water, the cocks $c^7$ and $c^8$ are closed. The cock $c'$ being then opened, the pipes and stove fill with water from the tank. The cock $c'$ is then closed. The water then circulates from the stove through the pipes $a^3$ and $a^4$ to the car and back through the pipe $a^5$ to the stove. When steam is to be used, the cocks $c'$ and $c^2$ are closed and $c^7$ and $c^3$ are opened. The steam enters by the pipe $a^6$, passes through the stove, and thence to the car by the pipe $a^5$, returning by the pipes $a^4$ and $a^7$ to the steam-trap B, into which all water of condensation flows, to be removed as hereinafter provided. It will be noted that the directions of the flow of the steam and of the water through the pipes $a^4$ and $a^5$ are opposed to each other.

The stove S is constructed principally of boiler-iron and its lateral walls are made double, as shown, forming between them a water-jacket chamber $s'$, through which the water from the radiator-pipes circulates. The elbowed pipes $s^2$ and $s^3$ are screwed into the inner wall of the stove and support between them the drum $s^4$, through which the hot water also circulates. The elbow $s^3$ also supports a grate $s^5$, which is adapted to turn horizontally upon it as an axis. The grate $s^5$ has an apron $s^6$ sufficiently large to cover the fire-door opening and a cylindrical flange $s^7$ on its upper side, which projects up under a similar flange dropped from the drum $s^4$. By revolving the grate $s^5$ from side to side the apron $s^6$ may be made to cover or uncover the fire-door opening, and the fire-door is provided with a pin $s^8$, which engages with a hole in the same, so that when the door is closed the grate and its apron cannot be moved. The grate $s^5$, its flange $s^7$, and the apron $s^6$ are designed to prevent any possible escape of the coals from the fire-box in event of the stove being overturned or broken. The fire-pot is lined with refractory brick and provided with a grate adapted to dump by removing the pin P. Both the fire-door opening and the ash-door opening are covered with double doors.

At the top and bottom of the stove are ventilated air-chambers E and E', which prevent the overheating of the top and bottom plates of the stove, which are unprotected by water-jackets. The smoke-stack has a jacket $E^2$ for the same purpose. The inner door of the ash-door opening I preferably make, as shown, of a single plate of iron with proper draft-holes.

The inner door of the fire-door opening may be constructed in the same manner as illustrated in Fig. 1, or in stoves of large size it may be constructed as shown in Fig. 8, where $D^2$ is a water-jacketed door connected with the outer circulation by a pair of steam-tight hinges H H, (shown in detail in Fig. 10,) $D^2$ representing the door and S the stove. The water enters from the stove-jackets by the pipe $h$ and enters the door by the pipe $h'$. $h^2$ is a packing-box, which is made effective by screwing down the nut $h^3$. The elbow $h'$ is stepped in a projection of the strap $h^5$, securely fastened to the stove, as shown, and revolves upon it and the end of the pipe $h$ as centers, allowing the free passage of steam and water.

In Fig. 9 is shown a safety-bolt for the door $D^2$. By pressing the knob $h^4$ the bolt may be withdrawn and the door opened.

The method of attachment of the pipes $a^3$ and $a^5$ to the stove is illustrated in Fig. 8. These pipes communicate with the water-jacket spaces, and it is necessary, in event of their being torn loose from the stove, that the water shall not escape from the chambers of the stove. The stove is provided with a projecting pipe-socket M, into which the pipe $a^3$ tightly fits. M' is a valve, which tends to press against its seat $M^3$ by the force of the spring $M^2$. When the pipe $a^3$ is introduced into the socket M, it is forced against the valve M' and forces it away from its seat $M^3$, thus allowing free passage to the water or steam, the end of the pipe $a^3$ within the water-jacket being provided with suitable water-passages at right angles to its longitudinal axis. On the withdrawal of the pipe the valve reseats itself and the water is retained in the stove. The water-jackets of the stove are always filled with water to the level of the pipe $a^5$, Fig. 1, when steam is being used as a heating agent, and are completely filled when water is used. When steam from without the car is used as a heating agent, it is admitted, as before stated, through the pipe $a^6$ and, traversing the system, arrives at the steam-trap B, where its further progress is stopped. In giving off heat it is condensed into water, which would soon fill the radiating-pipes to the exclusion of the steam if some means of disposing of it were not provided. By this invention the water of condensation is automatically removed, as the lowered temperature of the car makes the introduction of fresh steam necessary. The means for doing this are as follows: The steam-trap B is placed at the lowest point in the system, and the water of condensation consequently runs down into it and raises the float F, Fig. 7, which opens the valve F' and allows the water to escape into the pipe $a^8$ until the water has descended to the level indicated in Fig. 7, when the valve again closes, and the opening of the steam-valve being below this level it is evident that no steam can enter the pipe $a^8$. The water rises in the pipe $a^8$ by virtue of the force of the steam behind it until it reaches the thermostat T, when, if the valve T' be open, it flows on through the pipe $a'$ into the tank A. If the valve T' be closed, it can go no farther and must accumulate in the radiator-pipes below.

The construction of the valve T' is shown in Figs. 4, 5, and 6. Figs. 4 and 6 show it open, while Fig. 5 shows it shut. $a^8$ is the inlet-pipe, and $a'$ and $a^{10}$ the outlets. $a^{10}$ is very small and will pass but a small portion of the water running through the valve.

The construction of the valve is evident from the drawings, the plug V, turning in the valve V', operating to open and close the ports.

The valve is operated by a stem $t$, which moves with a float $F^2$. The water enters the thermostat by the spout $a^{10}$ and flows through the aperture $a^{11}$ to the float-chamber W'. Beneath the float-chamber $W^2$ and connected therewith is situated the bell-chamber $t^5$, in which is the bell $t^3$. This bell rises and falls according to the pressure of air within the reservoir Y, communication with which is had through the pipe $a^{13}$. The flexible tube $t^2$ rises and falls with the bell $t^3$ and controls the height of the water in the float-chamber W', for when it is down the water flows through it from the chamber W' to the chamber $W^2$ and thence out by the pipes $a^{12}$ and $a^9$. The height of the mouth of the tube $t^2$ is controlled by the rise and fall of the bell $t^3$, and this by the air-pressure in the tube $a^{13}$ communicating with the air-tank Y, which is placed in the apartment to be heated. When steam is first admitted, the cock $c^{10}$ is opened, the bell $t^3$ falls, the valve T' stands open, and the water in the radiation-pipes is rapidly forced into the tank, its place being taken by the steam. When the apartment has arrived at the temperature desired, the cock $c^{10}$ is closed. Any increase in temperature then causes an expansion of the air in the air-tank Y and a consequent rise of the bell $t^3$ and tube $t^2$, and the valve T' is closed and the water of condensation begins to fill the radiation-pipes to the exclusion of the steam. When the temperature falls, the bell $t^3$ falls with it and the operations are reversed. Thus the operation of the thermostat is controlled by the heat of the apartment and no more steam is used than is required. By opening the cocks $c$, $c^5$, $c^8$, and $c^9$ all water may be emptied from the apparatus.

I do not limit myself to the thermostat herein shown, as it may be made of metal or of a rubber diaphragm operated by air or water. The thermostat I have shown is what I would term a "hydraulic thermostat," wherein water-power is used beside expansive forces.

I do not limit myself to any particular material for producing expansive forces, nor to any particular method of transmitting such forces, as I could use a tank and float, water and diaphragm, or yet a sensitive metallic spring with gears and levers; but I do use in combination with force produced by expansive devices water-power as a feature of my thermostat.

In case this device is used as a car-heater, the thermostat and water-tank may be combined in a single casing and placed upon the top of the car, the practical effect being that of enlarging the thermostat and placing a reservoir within around the waste-pipe. The bell and attachments would then be placed below, within the car, being connected with the tank by a pipe through which the steam would pass up into the tank, or the bell could operate the valve at the lower end of the pipe. Any ordinary ball and cock could then be used, as the waste water operating the thermostat could be taken from the tank. A safety-valve, water-gage, and pressure-gage—such as are commonly used in water and steam heaters—may be affixed to this apparatus at a convenient point.

To operate this apparatus as a hot-water heater, the system is filled with water from the tank by opening the cock $c'$, which is then closed. A fire is then started in the stove and the water circulating through the jacket-chambers before described receives the heat and distributes it through the car, the stove itself acting as a radiator, if not inclosed. When it is desired to change to steam as a heating agent, the cocks $c^7$ and $c^8$ are opened and $c'$ and $c^2$ closed. The water is then forced back into the tank, as before described, its place in the radiator-pipes being occupied by the steam which enters by the pipe A. It is to be noted here that the water-jacket chambers of the stove are filled with water to the level of the pipe $a^5$. This prevents the burning out of the stove. To regulate the supply of steam, $c$ is opened until the car has attained the desired temperature, when it is closed, the heat of the car being automatically kept at that point by the thermostat and appendages above described.

When steam is used, fire may be kept in the stove or not, as may be desired. In case of accident, the escape of the coals from the stove is practically impossible, and hence there is no danger of fire from that source.

Having now described my invention, what I claim as new and of my invention is—

1. A heater consisting of a stove provided with jacketed chambers, a circulating system in operative contact with said heater, a water-tank in communication with said system, a steam-pipe and drip-tank also in communication with said system, a pipe having a valve and leading from the lower part of the drip-tank to the water-tank, a float in the drip-tank connected with the valve in said pipe, a steam-pipe leading from the circulating system to the drip-tank, and suitable valves for regulating the flow of water or steam into and through the circulating system, substantially as described.

2. In a stove, a revolving protector-grate supported over the fire-pot, having an apron-guard covering the fire-door opening, whereby the escape of the coals is prevented when the stove is overturned, substantially as set forth.

3. In a heater, a jacketed stove, in combination with a pipe $a^3$, provided at its end with suitable water-passages at right angles to its axis, a projecting pipe-socket M, provided with the seat $M^3$, a valve M', and a spring $M^2$, whereby the water in the stove is held therein when the said pipe is disconnected, substantially as described.

4. In a steam-heating apparatus, the combination, with a circulatory radiating system, of pipes connected to a steam-supply and provided with suitable regulating-valves, of a water-tank communicating with said system, a drip-tank and float-operated outlet-valve, and a thermostat consisting of a float and water-box provided with suitable water chambers and outlets, a pneumatic bell and a flexible pipe connected with said valve, whereby the cut-off valve of the water-discharge pipe of said system is automatically operated through the changes in temperature of the apartment heated, all constructed, arranged, and operated substantially as described.

5. In a steam-heating apparatus, a circulating system, in combination with a drip-tank, a water-discharge pipe communicating with said tank by a float-operated cut-off valve, an air-receptacle, and a thermostat inclosed in a suitable case, having tubular connection with said receptacle and consisting of a float operating said cut-off valve, an inverted bell dipping under water, and a flexible tube connected with said bell, whereby the height of the mouth of said tube determines the position of said cut-off valve, substantially as described.

6. In a steam-heating apparatus, in combination, the system of radiating-pipes connected to a suitable steam-supply and provided with suitable regulating-valves, a trap B, situated at the lowest point of said system and provided with an outlet-pipe and float-operated valve, a water-tank and air-tank, and a pneumatic thermostat T, substantially as described, whereby the relative amount of steam and water in the circulating system is automatically regulated, all constructed, arranged, and operated substantially as set forth.

7. In a heating apparatus, a circulating system, in combination with a water-tank communicating with said system, a steam pipe and trap also in communication with said system, a pipe having a valve and leading from the lower part of the trap to the water-tank, a thermostat controlling said valve, a steam-pipe leading from the circulating system to the trap, and suitable valves for regulating the flow of water or steam into and through the circulating system, arranged and operating substantially as and for the purposes described.

8. In a water-heater, the combination of the circular drum $s^4$, having a downwardly-projecting flange, the revolving protector-grate $s^5$, provided with the flange $s^7$, and the apron-guard $s^6$, covering the fire-door opening, constructed and arranged substantially as described.

In witness whereof I have hereunto set my hand.

GEO. L. SHOREY.

Witnesses:
WM. B. H. DOWSE,
M. W. MARSTON.